US 8,839,228 B2

(12) United States Patent
Thorat et al.

(10) Patent No.: US 8,839,228 B2
(45) Date of Patent: Sep. 16, 2014

(54) SYSTEM AND METHOD FOR UPDATING AN OFFLINE VIRTUAL MACHINE

(75) Inventors: Nishant Shivajirao Thorat, Maharashtra (IN); Bharti Gupta, Haryana (IN)

(73) Assignee: CA, Inc., Islandia, NY (US)

( * ) Notice: Subject to any disclaimer, the term of this patent is extended or adjusted under 35 U.S.C. 154(b) by 1116 days.

(21) Appl. No.: 12/764,685

(22) Filed: Apr. 21, 2010

(65) Prior Publication Data

US 2011/0265076 A1    Oct. 27, 2011

(51) Int. Cl.
 G06F 9/44 (2006.01)
 G06F 9/445 (2006.01)
 G06F 9/455 (2006.01)
(52) U.S. Cl.
 CPC .............. *G06F 9/45533* (2013.01); *G06F 8/65* (2013.01)
 USPC ......................................................... 717/172
(58) Field of Classification Search
 USPC ......................................................... 717/172
 See application file for complete search history.

(56) References Cited

U.S. PATENT DOCUMENTS

| 6,854,009 B1 * | 2/2005 | Hughes ......................... 709/220 |
| 8,352,939 B1 * | 1/2013 | Edwards et al. .................. 718/1 |
| 2006/0259964 A1 * | 11/2006 | Maldonado et al. ............ 726/16 |
| 2009/0007105 A1 * | 1/2009 | Fries et al. ......................... 718/1 |
| 2011/0191453 A1 * | 8/2011 | Gouge et al. .................. 709/223 |

* cited by examiner

*Primary Examiner* — Li B Zhen
*Assistant Examiner* — Bradford Wheaton
(74) *Attorney, Agent, or Firm* — Baker Botts, L.L.P.

(57) ABSTRACT

A system and method for updating an offline virtual machine are disclosed. The method comprises mounting an image of an offline virtual machine on a host operating system. The method further comprises generating drive-mapping information for the mounted virtual machine image and loading registry information of the mounted virtual machine image onto the host operating system using the drive-mapping information. An update to be applied to the offline virtual machine is determined based on the registry information and a patch bundle is retrieved based on the determination, wherein the patch bundle comprises registry update instructions, file system update instructions, and a patch file. The patch bundle is executed on the host operating system to update the offline virtual machine.

15 Claims, 4 Drawing Sheets

SYSTEM AND METHOD FOR UPDATING AN OFFLINE VIRTUAL MACHINE

TECHNICAL FIELD

The present application relates generally to computer systems, and more specifically to virtual machines.

BACKGROUND

The present application relates generally to computer systems, and more specifically to virtual machines.

A virtual machine (VM) is an environment, usually a program or operating system, which does not physically exist but is present within another environment. In this context, the VM is called a "guest" while the environment it runs within is called a "host." One host environment can often run multiple isolated VMs at once. Furthermore, the VM is a virtualized representation of physical computer hardware such as a processor, memory, or an input/output device. The VM may map the virtualized component's interface and visible resources onto the interface and resources of the underlying real hardware. Consequently, the real hardware may appear as a different virtual system or even as multiple virtual systems. As VMs are isolated from each other, they prevent undesirable interactions or outright conflicts between applications. Furthermore, VMs are separated from the physical resources they use, allowing the host environment to dynamically assign resources among the VMs. Virtual machines allow flexible and efficient use of hardware resources. By increasing hardware utilization and decreasing capital and operational costs, virtual machines have become an integral part of computing environments.

SUMMARY OF EXAMPLE EMBODIMENTS

The present disclosure is directed to a system and method for updating offline virtual machines. According to particular embodiments, a method for updating offline machines comprises mounting an image of an offline virtual machine on a host operating system. The method further comprises generating drive-mapping information for the mounted virtual machine image and loading registry information of the mounted virtual machine image onto the host operating system using the drive-mapping information. An update to be applied to the offline virtual machine is determined based on the registry information and a patch bundle is retrieved based on the determination, wherein the patch bundle comprises registry update instructions, file system update instructions, and a patch file. The patch bundle is executed on the host operating system to update the offline virtual machine.

Another embodiment of the application describes a system for updating an offline virtual machine. The system comprises a processor-controlled server, the server comprising a memory and a virtual machine image mount engine. The virtual machine image mount engine in operable to mount an image of an offline virtual machine on a host operating system and generate drive-mapping information. The server further comprises a virtual machine image-rendering engine that is operable to load registry information of the mounted virtual machine image onto the host operating system using the drive-mapping information. The server further comprises a patch manager that is operable to determine an update to be applied to the virtual machine by examining the registry information and retrieve a patch bundle based on the determination. The patch bundle comprises virtual machine update information, patch files, and registry update instructions and file system update instructions. The server further comprises an offline virtual machine image update engine that is operable to execute the patch bundle and update the offline virtual machine.

Another embodiment of the application describes logic encoded in a tangible computer readable media. The logic is operable, when executed by a processor-controlled computer to mount an image of an offline virtual machine on a host operating system and generate drive-mapping information for the mounted virtual machine image. The logic is further operable to load registry information of the mounted virtual machine image onto the host operating system, using the drive-mapping information, and determine an update to be applied to the offline virtual machine by examining the registry information. The logic is further operable to retrieve a patch bundle based on the determination, wherein the patch bundle comprises registry update instructions, file system update instructions, and a patch file. The logic is further operable to execute the patch bundle on the host operating system to update the offline virtual machine.

Certain embodiments of the disclosure may provide various technical advantages. For example, certain embodiments may yield greater savings in hardware resources and improved launch time. Embodiments of the claimed invention provide patching of offline or suspended virtual machines and deliver offline analysis and remediation of vulnerable VM images whose provisioned state has grown stale.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

Figure 1:
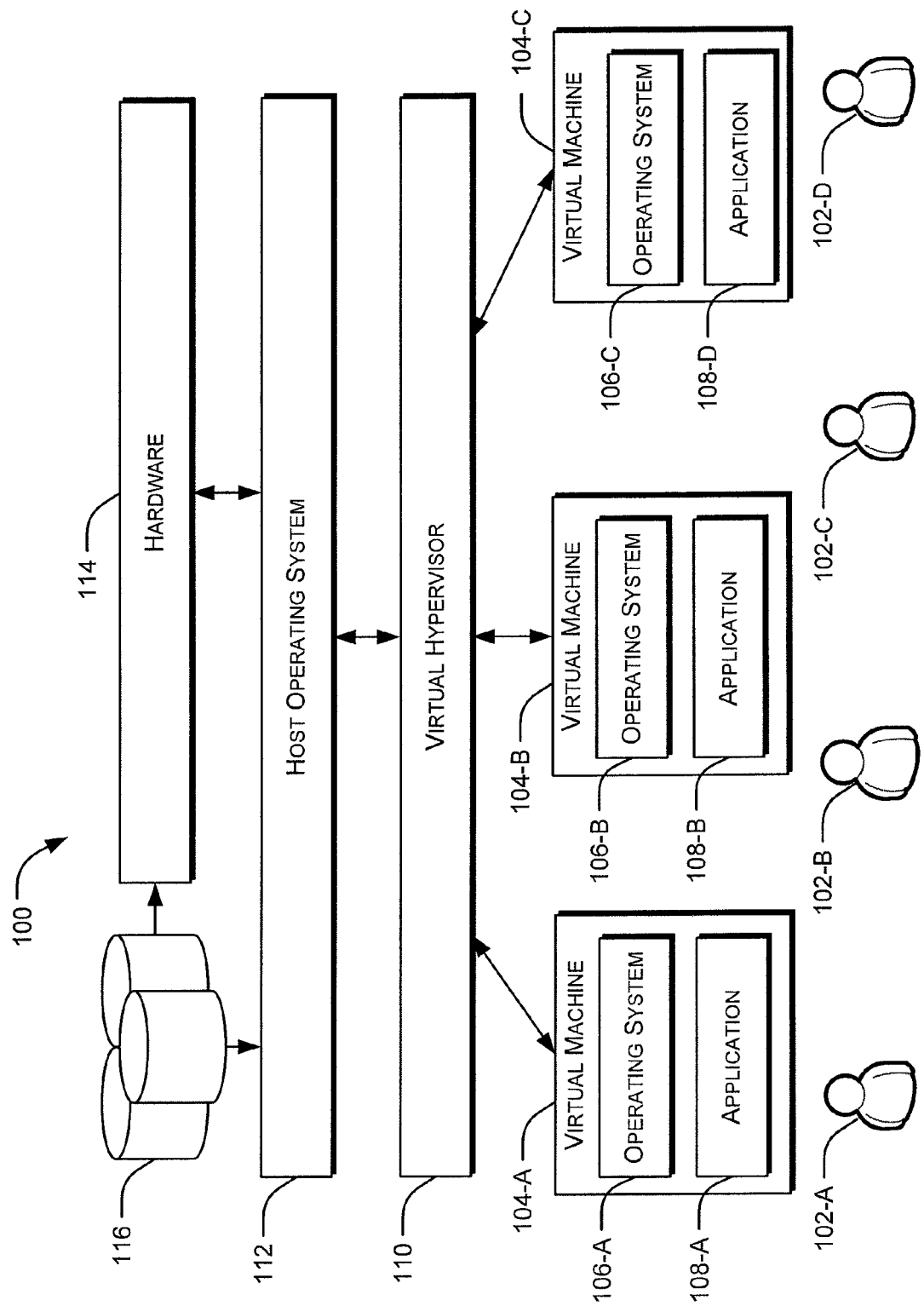
FIG. 1 is a block diagram illustrating an exemplary environment in which the subject matter of the disclosure can function.

The following detailed description is made with reference to the figures. Exemplary embodiments are described to illustrate the subject matter of the disclosure, not to limit its scope, which is defined by the appended claims.

VMs are often halted and stored in an inactive 'offline' state as VM images in the system memory, from which they can be retrieved and re-started as and when required. Oftentimes, VMs can remain inactive for weeks or months before they are retrieved and restarted. The inactive state of the VM may raise concerns, as most applications or software constructs require regular updates in the form of security or functionality patches, or hot fixes. Since halted or stored VMs cannot perform any processing, they cannot be updated regularly, which may make them outdated, or functionally flawed. Furthermore, VMs may require operating system updates, as well as compliance with current company standards. Non-compliance to company standards, missing OS updates, and outdated anti-virus definitions may compromise the VM's security and integrity. When such outdated VMs are re-started, they may also become a threat to the network, or the network could become a threat to the outdated VMs. For example, outdated applications or virus profiles may render the VM vulnerable.

Some software update mechanisms attempt to deal with this issue by retrieving and restarting all stored VMs at predetermined times. Upon restart, a VM manager checks for updates or patches. If any updates are present, the VM is updated and stored again.

Some other software update mechanisms, when deploying a patch to an offline VM image, copy the desired patches to the VM image file and install a scheduler on the VM image. When the VM image is activated, the patches are installed, or are installed at a scheduled time if the deployment was scheduled for a later time. The deployment process, however, does not automatically launch the VM image. The VM image may remain offline for days, weeks, or months after a deployment is performed. The patches are installed only when that image is eventually launched.

These processes, however, require resources such as a CPU, or memory, which increases maintenance cost. Moreover, usage of software update mechanisms that wait for the VM to be activated do not alleviate the compliance threats or improve the VM's security.

Embodiments of the claimed invention update a virtual machine (VM) in its 'offline' state, i.e., without activating the VM. A VM is stored as a VM image in the offline state using one or more image file formats. These may include, but are not limited to, VMware's VMDK (Virtual Machine Disk Format), Microsoft's VHD (Virtual Hard Disk), OVF (Open Virtualization Format), and similar file formats. A virtual machine image mount engine hosts the VM image on a host operating system and generates drive-mapping information. For example, according to particular embodiments, utilities such as VMware-mount, Microsoft's VHDMount, or similar utilities may be employed to mount a virtual machine image on the physical disk X: of the host computer and map this disk to drive C: of the virtual machine. The virtual machine image-rendering engine uses the generated drive-mapping information to load registry information of the VM image on to the host operating system. A patch manager examines the registry information to determine the update requirements of the offline virtual machine and retrieves a patch bundle according to the determined requirements. The patch bundle may include VM update information, patch files, registry update instructions, and file system update instructions. An offline virtual machine update engine executes the patch bundle to update the offline virtual machine. In some embodiments, a counter-check engine confirms the updates of the virtual machine upon activation of the virtual machine.

The following sections describe typical virtualization environments for better understanding the embodiments of the present disclosure. Most computing systems today include a virtualization program that allows a host-computing device to emulate the instructions of an unrelated CPU, called the guest. The host computer can thus execute an application that causes one or more host instructions to be called in response to a provided guest instruction. In this way, the host computer can run both software designed for its own hardware architecture and software written for computers having an unrelated hardware architecture. Furthermore, virtualization programs can help execute multiple incompatible operating systems on a single CPU by hosting the operating systems in isolation and thereby allowing the otherwise incompatible operating systems to run concurrently on the same host-computing device.

FIG. 1 illustrates an exemplary virtualized computing environment 100 in which the subject matter of the disclosure can function. The virtualized computing environment 100 generally includes one or more virtual machines 104 (hereafter VM 104), each of which runs a guest operating system 106 and application 108. The computing needs of users 102 drive the functionality of the VMs 104. A virtual hypervisor 110 provides an interface between the VMs 104 and a host operating system 112 and allows multiple guest operating systems 106 and associated applications 108 to run concurrently. The host operating system 112 handles the operations of a hardware platform 114 capable of implementing VMs 104. A data storage space 116 may be accessed by the host operating system 112 and is connected to the hardware platform 114.

The hardware platform 114 generally refers to any computing system capable of implementing VMs 104, which may include, without limitation, a mainframe, personal computer (PC), handheld computer, mobile computing platform, server, or any other appropriate computer hardware. The hardware platform 114 may include computing resources such as a central processing unit (CPU); networking controllers; communication controllers; a display unit; a program and data storage device; memory controllers; input devices (such as a keyboard, a mouse, etc.) and output devices such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM). According to the illustrated embodiment, the host operating system 112 stands between the hardware platform 114 and the users 102 and is responsible for the management and coordination of activities and the sharing of the computing resources. Besides acting as a host for computing applications that run on the hardware platform 114, the host operating system 112 may operate at the highest priority level, executing instructions associated with the hardware platform 114, and it has exclusive privileged access to the hardware platform 114. The priority and privileged access of hardware resources affords the host operating system 112 exclusive controls over resources and instructions, and may preclude interference with the execution of different application programs or the operating system. The host operating system 112 creates an environment for implementing a VM, hosting the "guest" virtual machine. One host operating system 112 is capable of implementing multiple isolated virtual machines simultaneously.

The virtual hypervisor 110 (which may also be known as a virtual machine monitor or VMM) runs on the host operating system 112 and provides an interface between the VM 104 and the hardware platform 114 through the host operating system 112. The virtual hypervisor 110 virtualizes the computing system resources and facilitates the operation of the VMs 104, and it may provide the illusion of operating at the highest priority level to the guest operating system 106. In fact, the virtual hypervisor 110 merely maps the guest operating system's priority level to a priority level lower than the top most priority level. As a result, the virtual hypervisor 110 can intercept the guest operating system 106, executing instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 are also performed by the virtual hypervisor 110.

VMs 104 present a virtualized environment to guest operating systems 106, which in turn provide an operating environment for applications 108 and other software constructs. Here, VMs 104 that have been inactive or dormant for an extended period may become outdated and/or functionally flawed, requiring security or functionality updates before reactivation. This updating may be performed in the virtualized computing environment 100. For example, a dormant VM 104 can be scanned offline by an offline scanning engine to provision for malware signatures, OS patches, application patches, and other updates. This operation can also update or install security measures, such as anti-virus, anti-spyware, and intrusion prevention solutions (IPS). This pre-provisioning, or pre-clearing, of an inactive VM reduces cost in time and computer resources. Pre-provisioning may also be performed periodically in the background, to maintain dormant VMs in a ready-to-activate status. These and other embodiments of the claimed invention will be described in detail in connection with FIGS. 2-4.

Figure 2:
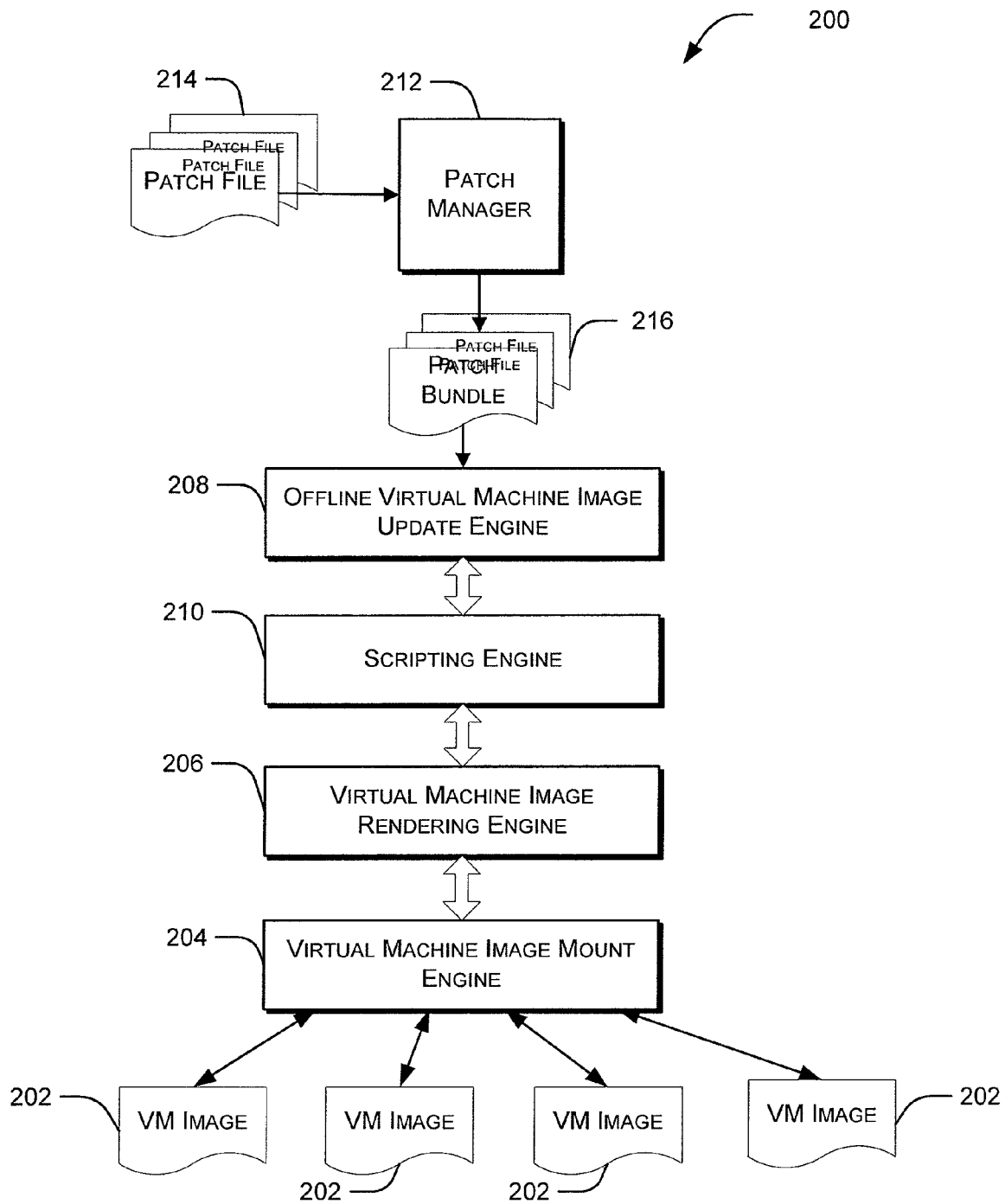
FIG. 2 is a block diagram illustrating an exemplary computing framework for updating an offline virtual machine.

FIG. 2 illustrates an exemplary computing framework 200 for updating an offline virtual machine. The computing framework 200 includes VM image files 202 of the VMs 104 that may be mountable by a virtual machine image mount engine 204 on a host operating system 112. The framework further includes a virtual machine image-rendering engine 206, a patch manager 212, one or more patch files 214, a patch bundle 216, a scripting engine 210, and an offline virtual machine image update engine 208.

VMs 104 are stored in the data storage space 116 as a VM image file 202, which is a virtual disk corresponding to the physical hard disk of the VM 104. Converting VMs to images allows the operating system to halt and re-activate the VM by retrieving and re-loading the stored image files from the data storage space 116. The VM image file 202 may include system files, data files, and file system information associated with the VM 104 and the guest operating system 106. A number of image file formats may be utilized to store these VM image files 202, such as VMware's VMDK (Virtual Machine Disk Format), Microsoft's VHD (Virtual Hard Disk), OVF (Open Virtualization Format), or any other suitable image file format. For example, the VM image file 202 may be represented as a physical hard disk C: on the guest operating system 106 and may include data associated with the application 108 running inside the guest operating system 106 and data indicative of the host operating system 112. According to particular embodiments, the virtual image is stored in OVF image file format, and the virtual image may further include the OVF file size and data indicative of the disk geometry and type.

The virtual machine image mount engine 204 mounts the VM image file 202 as a virtual disk on the host operating system 112 and renders the VM image 202 to file system data. Utilities such as VMware's VMware-mount, Microsoft's VHDMount, or any other mount engines known in the art, may be used to mount the VM image file 202. Such utilities may either run by using command-line tools or APIs (Application Programming Interfaces).

In an alternative embodiment, the VM image mount engine 204 may manually locate the VM image 202 before mounting it from either a host computer, a network shared memory, or a portable external storage device.

The virtual machine image-rendering engine 206 may load the file system information of the VM image 202. Loading of the file-system information may include loading user file information and system file information. Furthermore, the VM image-rendering engine 206 may generate drive-mapping information of the mounted VM image 202. For example, according to particular embodiments, VMware-mount mounts the VM image 202 as virtual disk X: on the host operating system 112 and the VM image-rendering engine 206 maps the virtual disk X: to drive C: on guest operating system 106. Next, the VM image-rendering engine 206 may locate the registry information and identify the operating systems 106 and 112, system files, and data files of the mounted VM image 202 using the drive-mapping information. Then, the VM image-rendering engine 206 loads the registry information. Loading the registry information includes loading user registry information and system registry information onto the host operating system 112. The VM image-rendering engine 206 further maintains the registry and file system mapping information between the host operating system 112 and guest operating system 106.

The patch manager 212 may determine an update to be applied to the VM 104 by examining the registry information identified by the VM image-rendering engine 206, and it may record the registry and file system locations to be modified for updating the VM 104. Additionally, the patch manager 212 may examine the registry keys and values to determine whether these values have to be modified, updated, created, or deleted. Similarly, the patch manager 212 examines the file keys and values to check for modifications, updates, creation, and deletion requirements. Upon determining and recording the update requirements, the patch manager 212 retrieves the patch bundle 216.

In particular embodiments, the patch bundle 216 generation may be independent of the update requirement determination. The patch bundle 216 may include, without limitation, virtual machine update information, one or more patch files 214, registry update instructions, and file system update instructions. The patch bundle 216 may constitute a JavaScript-based patch script that records the virtual machine update information and generates registry update instructions and file system update instructions.

The patch bundle 216 retrieval includes recording VM update information and file system modification information, writing the registry and file system update instructions, and retrieving the patch files 214, and bundling them together.

Typically, a patch file 214 is verified in a test environment before deploying it to the VM 104. Once the patch file 214 is verified and approved for deployment, the patch manager 212 determines the update requirements. For example, a patch file for updating a VM with a new virus protection program may be verified in a test environment and approved. Then, the patch manager 212 can check the registry information of all the inactive VMs to determine which VMs are suitable to receive the patch update.

The virtual machine update information may include virtual machine registry information location, virtual machine file system location, or system configuration information of the virtual machine image 202 to be updated. The virtual machine update information may further include other configuration information such as file modified/created timestamp required for updating the VM image 202. This information may be utilized to replace files based on certain criteria. For example, all files modified after Jan. 1, 2010 may be replaced. The other configuration information may include version number of library files.

The registry and file system update instructions may include directions to update virtual machine system files, replace virtual machine system files, or update virtual machine registry locations. According to particular embodiments, the patch manager 212 may detect an old version of a VM image file, such as "avifile.dll" file stored at location "C:\Windows\System32\avifile.dll" as 4.90.0.3000 and modifies the file with an updated version file 4.95.0.3000. In addition, the patch manager may record the registry location "HKLM\Software\Microsoft\Windows\aviversion=4.90.0" to be modified with version value 4.95.0.

The patch files 214 may include, without limitation, executable (.exe), .cab, or configuration (.dll) files. Examples of patch files may include operating system updates, updated anti-virus or anti-spyware definitions and signatures, and intrusion prevention solutions. Depending on the registry update instructions and the file system update instructions, the patch files 214 are utilized to update the VM 104.

The Offline Virtual Image update engine 208 may use VM update information, registry update instructions, file system update instructions and patch files packaged as the patch bundle 216.

The VM image-rendering engine 206 may use the drive-mapping information and directs the execution of the virtual machine update information and patch files 214 to an appropriate host operating system 112 location. The registry update instructions from the patch bundle 216 may also be directed to the registry hives loaded from the virtual disk device. For example, according to particular embodiments, the VM update information may identify the update location as "C:\Windows\System32\avifile.dll." Nevertheless, as the drive C: is mapped to the virtual disk X: on the host operating system 112, the VM image-rendering engine 206 may redirect the patch bundle 216 to the location "X:\Windows\System32\avifile.dll" on the host operating system 112. Moreover, the registry update instructions "HKLM\Software\CA" may be redirected to a registry hive such as "HKLM\VirtualHKLM\Software\CA."

The scripting engine 210 may interpret the patch script to update the offline VM with patch files 214. It helps in interfacing with the VM image-rendering engine 206 and may be a part of the offline VM image update engine 208. The scripting engine 210 may direct the VM image-rendering engine 206 to add, delete, modify, and update the registry and file locations according to the interpreted patch script instructions. The offline VM image update engine 208, on receiving the patch bundle 216, uses the registry update instructions and the VM update information to execute the patch files 214. The execution of the patch bundle updates the offline virtual machine 204.

In alternative embodiments, the computing framework 200 for updating an offline virtual machine may also include a counter-check engine to confirm the VM updates. To this end, the counter-check engine may activate the offline VM 104 and check whether the correct updates have been installed on the virtual machine. In alternative embodiments, the checking may be carried out offline, without activating the VM 104. If the latest updates are missing or incorrectly installed, the update engine 208 may attempt to update the virtual machine again. The counter-check engine may further report missing or incorrect updates to the host operating system 112 for auditing or correction purposes.

Those in the art will understand that offline virtual machines may require regular updates such as anti-malware signatures, anti-virus definitions, OS patches, application patches, and similar maintenance. Thus, the offline virtual machine update system set out in the discussion above may be performed on a regular basis in the background to place a dormant VM into service at a moment's notice.

Those in the art will understand that a variety of reasons may initiate the need for a virtual machine update. The reasons may include keeping the VM 104, the guest operating system 106, and the application 108 updated. Features such as extra functionality for the VM 104 or greater accountability to security concerns may also benefit from an offline virtual machine update. Moreover, the update mechanism for offline VMs described above can be exploited for debugging purposes and can further increase the reliability and robustness of VMs.

Figure 3:
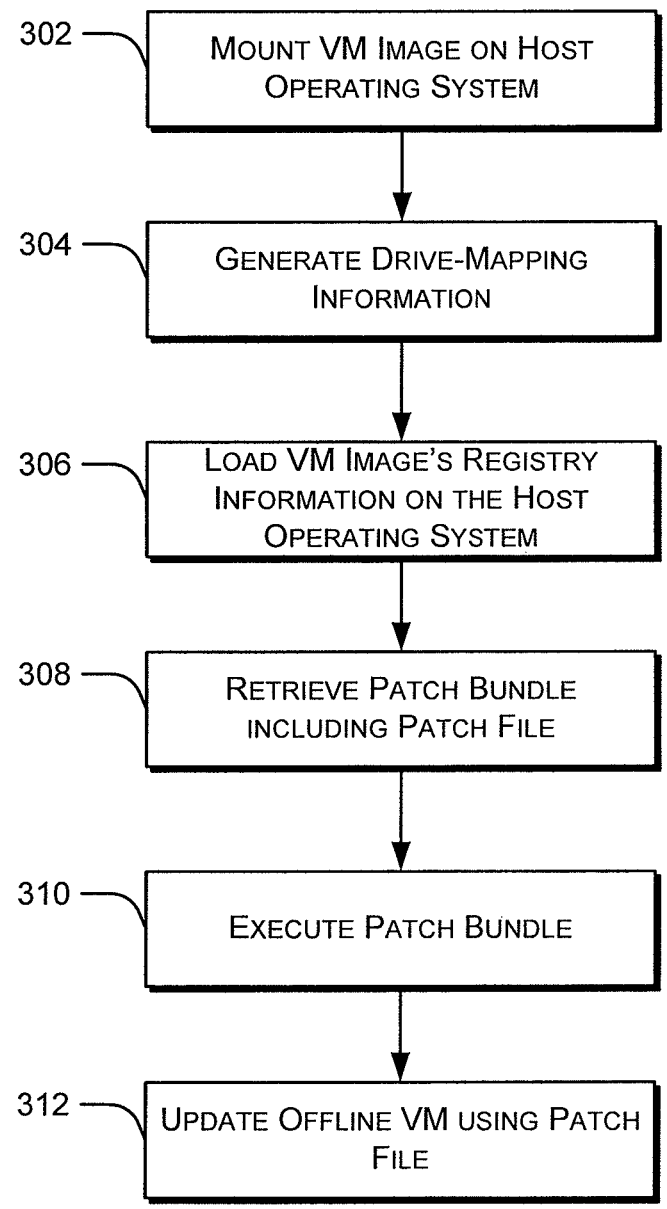
FIG. 3 is a flow chart illustrating an exemplary method for updating an offline virtual machine.

FIG. 3 illustrates an exemplary method 300 for updating an offline virtual machine. This illustrated embodiment may be described in the general context of computer executable instructions. Generally, computer executable instructions can include routines, programs, objects, or similar instructions stored in a non-transitory medium, that are capable of performing particular functions or implementing particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

At step 302, the virtual machine image 202 of the offline VM 104 is mounted by the virtual machine image mount engine 204 as a virtual disk on host operating system 112 and is rendered to file system data. For example, a VM image "CAimage.ovf" stored in Open Virtualization Format is mounted by "VMware-mount" VM image mounting utility as a virtual disk X: on the host operating system. The VM image mount engine 204 may manually locate the VM image 202 either from a host computer, a network shared memory, or a portable external storage device before mounting the VM image 202.

Moving to the next step, 304, the VM image-rendering engine 206 may generate the drive-mapping information of the VM image 202 mounted in step 302 between the virtual disk of the host operating system 112 and the physical disk of guest OS 106. For example, the virtual disk X: of the host operating system 112 is mapped to drive C: on VM guest operating system 106. The drive-mapping information may be used for redirecting the virtual machine update information, patch files 214, and registry and file system update instructions to the appropriate host operating system 112 location. The execution of registry update instructions may be directed to the registry hives loaded from the virtual disk device. Before generating the drive-mapping information, the VM image-rendering engine 206 may load the file system information of the VM image 202. The loading of file system information may include loading user file hives and system file hives.

At step 306, the VM image-rendering engine 206 loads the VM image's registry information on the host operating system 112. The loading of registry information may include loading user registry hives and system registry hives. For loading the registry information, the VM image-rendering engine 206 may locate the registry information and identify the operating systems 106 and 112, system files, and data files of the VM image 202 using the drive-mapping information. The VM image-rendering engine 206 may further maintain the registry mapping information between the host operating system 112 and guest operating system 106.

The method 300 continues to step 308 where the patch manager 212 retrieves patch bundle 216. Patch bundle 216 may include patch files 214, VM update information, file system modification information, registry update instructions, and file system update instructions. The update requirements of the VM 104 are determined by examining the registry information identified in step 306 by patch manager 212. According to particular embodiments, the registry and file system locations to be modified are recorded, and registry and file system update instructions are generated by running a JavaScript-based patch script. The retrieved patch bundle is provided to the offline VM image update engine 208.

The patch manager 212 generates executable (.exe) and configuration (.dll) patch files 214 after examining the guest operating system 106 and applications 108. The updates may be retrieved either locally from data storage space 116 or through a remote server. Depending on the registry update instructions, the patch files are used to update the VM 104.

VM registry information location, virtual machine file system location, and system configuration information of the offline VM image 202 may be included in the VM update information. Other configuration information, such as file modified/created timestamp, may also be included in the VM update information. The other configuration information may be version number of library files.

Moving to the next step 310, the offline VM image update engine 208 executes the patch bundle 216 on the host operating system 112. The patch bundle 216 execution starts the processing of registry update instructions, file system update instructions, and the VM update information. The processing of registry update instructions may perform the steps of replacing virtual machine system files, updating virtual machine system files, updating virtual machine registry locations using the VM update information, or any combination thereof.

At step 312, the offline VM image update engine 208 may execute the patch files 214 to update the offline VM 104. Depending on the registry update instructions, the patch file 214 may perform the steps of updating the operating system, renewing anti-virus or anti-spyware definitions and signatures, installing intrusion prevention solutions, or any combination thereof.

Figure 4:
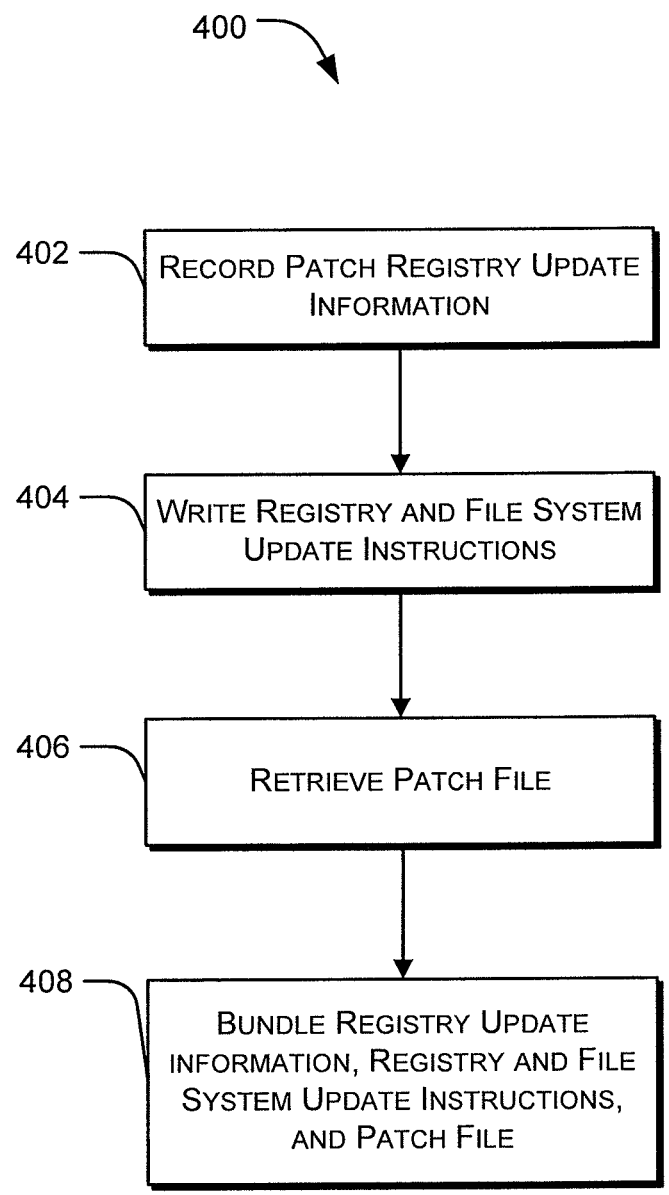
FIG. 4 is a flow chart illustrating an exemplary method for bundling patching information.

FIG. 4 illustrates an exemplary method 400 for bundling patching information used for updating offline VM 104. The exemplary methods are described with reference to the virtualized computing environment 100, the computing framework 200, and the exemplary method introduced in FIG. 3. At step 402, the patch manager 212 records the patch registry update information and the file system update information. The patch manager determines the update requirements of the VM 104 by examining the registry information identified in step 306 of method 300. Patch registry and file system update information may include, but is not limited to, VM registry information location, virtual machine file system location, and system configuration information of the offline VM image 202. Other configuration information may also be included in the VM update information.

Moving to step 404, the patch manager 212 writes a patch script that may include the registry update instructions and the file system update instructions. This patch script may be written manually after completing reverse engineering for the patch on test systems. In other embodiments, the patch manager may automatically write the patch script. Among other instructions, the patch script may include a set of instructions to update and replace the files associated with the VM 104.

At step 406, the patch manager 212 retrieves the patch files 214 for updating the VM 104. The patch files 214 may be retrieved either locally from data storage space 116 or from a remote server through a network connection. The patch files 214 include executable (.exe) and configuration (.dll) files generated after examining the guest operating system 106; applications 108; anti-virus, anti-spyware definitions and signatures; and intrusion prevention solutions. The registry update instructions written in step 404 determine the patch files 214 that need to be retrieved.

At step 408, registry and file system update information, registry and file system update instructions, and patch files 214 may be bundled together to generate the patch bundle 216. Those in the art will understand that the bundling process may be achieved by conventional processes known in the art Those in the art will understand that the steps set out in the discussion above may be combined or altered in specific adaptations of the disclosure. The illustrated steps are set out to explain the embodiment shown, and it should be anticipated that ongoing technological development may change the manner in which particular functions are performed. These depictions do not limit the scope of the claimed invention, which is determined solely by reference to the appended claims. Additionally, individual blocks may be deleted from the method without departing from the spirit and scope of the subject matter described herein. Furthermore, the method can be implemented in any suitable hardware, software, firmware, or combination thereof.

Systems and methods disclosed herein may be implemented in digital electronic circuitry, in computer hardware, firmware, software, or in combinations thereof. Apparatuses of the claimed invention may be implemented in a computer program product tangibly embodied in a machine-readable storage device for execution by a programmable processor. Method steps according to the claimed invention can be performed by a programmable processor of the hardware platform 114 executing a program of instructions to perform functions of the claimed invention by operating on offline VM 104 and executing patch bundle to update offline VM 104. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. The hardware platform 114 may include general and special purpose microprocessors. A processor receives instructions and data from memories such as data storage space 116. Storage devices suitable for tangibly embodying computer program instructions and data include all forms of non-volatile memory, including without limitation, semiconductor memory devices, such as EPROM, EEPROM, and flash memory devices; magnetic disks such as internal hard disks and removable disks; magneto-optical disks; and compact disk. Any of the foregoing can be supplemented by or incorporated in ASICs (application-specific integrated circuits).

The specification has described a system suitable for secure data transfer applications. The specification has set out a number of specific exemplary embodiments, but persons of skill in the art will understand that variations in these embodiments will naturally occur in the course of embodying the subject matter of the disclosure in specific implementations and environments. For example, the methods and systems described can be used to update a server from a remote location with the latest software updates or update a server to protect against any virus or malicious software attack. The method and system can also upload the server with any of the latest data or repair server from a remote location. It will further be understood that such variations and others as well, fall within the scope of this disclosure. Neither those possible variations nor the specific examples described above are set out to limit the scope of the disclosure. Rather, the scope of claimed invention is defined solely by the claims set out below.

What is claimed is:

1. A method for updating offline virtual machines, the method comprising:
    mounting an image of an offline virtual machine on a host operating system;
    generating drive-mapping information for the mounted virtual machine image;
    loading registry information of the mounted virtual machine image onto the host operating system using the drive-mapping information;
    determining an update to be applied to the offline virtual machine based on the registry information;
    retrieving a patch bundle based on the determination, wherein the patch bundle comprises:
        a patch file comprising the update to be applied to the offline virtual machine,
        registry update instructions configured to update the registry information based on the update to be applied to the offline virtual machine, and
        file system update instructions configured to update system files of the offline virtual machine as required to apply the update of the patch file to the offline virtual machine; and
    executing the patch bundle on the host operating system to update the registry information, update the system files of the offline virtual machine, and apply the update of the patch file to the offline virtual machine,
    wherein retrieving the patch bundle further comprises:
        recording virtual machine update information and file system modification information;
        writing the registry update instructions and the file system update instructions;
        retrieving the patch file; and
        bundling the patch registry update information, the registry update instructions and file system update instructions, and the patch file.

2. The method of claim 1, wherein mounting comprises mounting the virtual machine image as a virtual disk device on the host operating system.

3. The method of claim 2, further comprising redirecting execution of the registry update instructions and the file system update instructions to the virtual disk device.

4. The method of claim 1, wherein recording further comprises recording at least one of:
    registry system location;
    file system location; and
    system configuration information of the host operating system.

5. The method of claim 1, wherein writing the registry update instructions comprises writing instructions that are operable to perform at least one of:
    updating system files;
    replacing system files; and
    updating registry locations.

6. The method of claim 1, wherein loading the registry information comprises:
    loading user registry hives; and
    loading system registry hives.

7. The method of claim 1, further comprising counter-checking to confirm virtual machine update.

8. A system for updating offline virtual machines, the system comprising a processor-controlled server, the server comprising:
    a memory;
    a virtual machine image mount engine being operable to:
        mount an image of an offline virtual machine on a host operating system; and
        generate drive-mapping information;
    a virtual machine image-rendering engine being operable to load registry information of the mounted virtual machine image onto the host operating system using the drive-mapping information;
    a patch manager being operable to:
        determine an update to be applied to the virtual machine by examining the registry information; and
        retrieve a patch bundle based on the determination, wherein the patch bundle comprises:
            virtual machine update information,
            a patch file comprising the update to be applied to the offline virtual machine,
            registry update instructions configured to update the registry information based on the update to be applied to the offline virtual machine, and
            file system update instructions configured to update system files of the offline virtual machine as required to apply the update of the patch file to the offline virtual machine; and
    an offline virtual machine image update engine being operable to execute the patch bundle to update the registry information, update the system files of the offline virtual machine, and apply the update of the patch file to the offline virtual machine,
    wherein the patch manager is further operable to:
        record the virtual machine update information and file system modification information;
        write the registry update instructions and the file system update instructions;
        retrieve the patch file; and
        bundle the virtual machine update information, the registry update instructions, the file system update instructions, and the patch file.

9. The system of claim 8, wherein the virtual machine image mount engine mounts the virtual machine image as a virtual disk device on the host operating system.

10. The system of claim 9, wherein the virtual machine image-rendering engine redirects execution of the registry update instructions and file system update instructions to the virtual disk device.

11. The system of claim 7, wherein the offline virtual machine image update engine comprises a scripting engine for interfacing with the virtual machine image-rendering engine.

12. The system of claim 7, wherein the virtual machine update information comprises at least one of virtual machine registry information location, virtual machine file system location, or system configuration information of the virtual machine image to be updated.

13. Logic encoded in a non-transitory computer readable media, the logic operable when executed by a processor-controlled computer to:
    mount an image of an offline virtual machine on a host operating system;
    generate drive-mapping information for the mounted virtual machine image;
    load registry information of the mounted virtual machine image onto the host operating system using the drive-mapping information;

determine an update to be applied to the offline virtual machine by examining the registry information;
retrieve a patch bundle based on the determination, wherein the patch bundle comprises:
- a patch file comprising the update to be applied to the offline virtual machine,
- registry update instructions configured to update the registry information based on the update to be applied to the offline virtual machine, and
- file system update instructions configured to update system files of the offline virtual machine as required to apply the update of the patch file to the offline virtual machine; and execute the patch bundle on the host operating system to update the registry information, update the system files of the offline virtual machine, and apply the update of the patch file to the offline virtual machine, wherein the logic is further operable to:
- record virtual machine update information and file system modification information;
- write the registry update instructions and the file system update instructions;
- retrieve the patch file; and
- bundle the virtual update information, the registry update instructions, the file system update instructions, and the patch file.

14. The logic of claim 13, wherein the logic is further operable to mount the virtual machine image as a virtual disk device on the host operating system.

15. The logic of claim 14, wherein the logic is further operable to redirect execution of the registry update instructions and file system update instructions to the virtual disk device.

* * * * *